United States Patent
Bulson et al.

(10) Patent No.: US 7,617,272 B2
(45) Date of Patent: Nov. 10, 2009

(54) SYSTEMS AND METHODS FOR ENHANCING STREAMING MEDIA

(75) Inventors: Jason Andrew Bulson, McLean, VA (US); Susan Elizabeth Bibeault, Alexandria, VA (US); Seth Thomas Sites, Ashburn, VA (US)

(73) Assignee: Loudeye Corp., Seattle, WA (US)

( * ) Notice: Subject to any disclaimer, the term of this patent is extended or adjusted under 35 U.S.C. 154(b) by 822 days.

(21) Appl. No.: 10/252,400

(22) Filed: Sep. 24, 2002

(65) Prior Publication Data

US 2003/0061280 A1 Mar. 27, 2003

Related U.S. Application Data

(60) Provisional application No. 60/324,065, filed on Sep. 24, 2001.

(51) Int. Cl.
*G06F 15/16* (2006.01)
(52) U.S. Cl. .................. 709/203; 709/217; 709/219; 709/231
(58) Field of Classification Search .......... 709/203, 709/217–219, 227–228, 238, 246
See application file for complete search history.

(56) References Cited

U.S. PATENT DOCUMENTS

| | | | |
|---|---|---|---|
| 5,859,660 A * | 1/1999 | Perkins et al. ............... 725/32 |
| 5,987,509 A | 11/1999 | Portuesi | |
| 6,061,719 A | 5/2000 | Bendinelli et al. | |
| 6,173,317 B1 * | 1/2001 | Chaddha et al. ............. 709/219 |
| 6,452,609 B1 | 9/2002 | Katinsky et al. | |
| 6,693,648 B1 * | 2/2004 | Lyndon ..................... 709/203 |
| 6,792,469 B1 * | 9/2004 | Callahan et al. ............. 709/231 |
| RE38,619 E * | 10/2004 | Paratore et al. ............. 370/347 |
| 6,910,078 B1 * | 6/2005 | Raman et al. ............... 709/231 |
| 7,054,949 B2 * | 5/2006 | Jennings ..................... 709/238 |
| 2003/0046431 A1 * | 3/2003 | Belleguie ..................... 709/246 |
| 2005/0144296 A1 * | 6/2005 | Monroe et al. .............. 709/228 |

OTHER PUBLICATIONS

The International Search Report for PCT Application No. PCT/US02/30069; Filed Sep. 24, 2002; Date of Completion Jan. 26, 2003; Date of Mailing Feb. 14, 2003.

* cited by examiner

*Primary Examiner*—Bharat N Barot
(74) *Attorney, Agent, or Firm*—Alston & Bird LLP (57) ABSTRACT

Streaming media is delivered in various scenarios that include live/on-demand events, Real/Windows Media platforms, and Netscape/Internet Explorer browsers. Systems and methods for enhancing streaming media delivery in this environment are disclosed.

7 Claims, 5 Drawing Sheets

Event Table (scope = 4)

| Event ID | Event Name | Event Directory Name | Series ID |
|---|---|---|---|
| 1054 | Event 1 | event1 | 20045 |
| 1067 | Event 2 | event2 | 20045 |
| 1068 | Event 1 | Event1 | 20052 |
| 1069 | Event 2 | Event2 | 20052 |
| 1078 | Event 3 | event3 | 20045 | scopeidkey
(4, 1054)
(4, 1067)
(4, 1068)
(4, 1069)
(4, 1078)

Series Table (scope = 3)

| Series ID | Series Name | Series Directory Name | Client ID |
|---|---|---|---|
| 20045 | Product Launches | product | 10005 |
| 20052 | XYZ Events | xyzevents | 10005 |
| 20069 | Training Events | trainingevents | 10025 | scopeidkey
(3, 20045)
(3, 20052)
(3, 20069)

Client Table (scope = 2)

| Client ID | Client Name | Client Directory Name |
|---|---|---|
| 10005 | Client X, LLC | clientx |
| 10009 | Client Y, Inc | clienty |
| 10025 | Client Z, Inc | clientz | scopeidkey
(2, 10005)
(2, 10009)
(2, 10025)

Scope Definition Table

| Scope ID | Scope Name |
|---|---|
| 1 | Global |
| 2 | Client |
| 3 | Series |
| 4 | Event |

FIG. 5

SYSTEMS AND METHODS FOR ENHANCING STREAMING MEDIA

The present invention claims priority to provisional application No. 60/324,065, filed Sep. 24, 2001, entitled "Systems and Methods for Enhancing Streaming Media," which is incorporated herein by reference in its entirety.

BACKGROUND

The present invention relates generally to media delivery, and more particularly, to systems and methods for enhancing streaming media.

There are two primary forms of streaming video on the web: on demand streaming and real-time streaming (live). On-demand streaming takes a compressed video file, residing on a server, and sends it to a client computer for playback. The amount of data sent is evenly distributed throughout the playback of the video. Real-time streaming, on the other hand, is more like traditional live TV broadcasting, wherein a video stream of a live event is generated in real time.

One problem with many conventional streaming media technologies is the proliferation of incompatible platforms. With the development of streaming technologies, two primary players have emerged as industry leaders: Real Networks' RealMedia (Real), and Microsoft Windows Media (Windows Media). Real and Windows Media generally represent packages of software that enable data to be traded in a recognizable format, which is used for the client machine to interpret the compressed file.

In addition to the differences between Real and Windows Media, the delivery of streaming media must also account for two distinct web-browser environments: Netscape and Internet Explorer.

In combination, the streaming media options of live/on-demand, Real/Windows Media, and Netscape/Intenet Explorer present eight distinctly different delivery scenarios that must be accounted for. It is therefore a goal to generate a solution that enables consistent application and performance across various delivery scenarios. This consistency will enable the solution to hit the largest possible streaming media audience.

SUMMARY OF THE INVENTION

Streaming media is delivered in various scenarios that include live/on-demand events, Real/Windows Media platforms, and Netscape/Internet Explorer browsers. Systems and methods for enhancing streaming media delivery in this environment are disclosed.

BRIEF DESCRIPTION OF THE DRAWINGS

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENTS

A preferred embodiment of the invention is discussed in detail below. While specific implementations are discussed, it should be understood that this is done for illustration purposes only. A person skilled in the relevant art will recognize that other components and configurations may be used without parting from the spirit and scope of the invention.

Throughout this document, references to specific technologies are used to provide an example embodiment of the concepts of the present invention. It should be noted, however, that the scope of the invention is not limited to a specific choice of technology. Rather, the concepts of the present invention can be designed to be multi-format. While specific streaming-media technologies are referenced, they could be substituted with any streaming media-format assuming that format presents similar functionality. The same is true for both web browser and browser scripting languages.

To illustrate various issues that are presented by live events as compared to on-demand events, consider the example of captioning. In conventional closed captioning, the caption text is typically displayed in the lower third of the TV screen. Standard broadcast audio/video (AV) can be used to insert caption text into the AV stream and have the caption text displayed as part of the moving picture. This AV stream can then be encoded using the standard Real and Windows Media encoding technologies then played back using the standard Real and Windows Media playback.

The downside of this solution is that image quality for streams is typically far inferior to a broadcast image. Three factors affect the proper display of caption in the video window: resolution, image quality, and frames per second. Because these variables compete for bandwidth resources at typical Internet speeds, the image the resulting video quality in each frame produces text that is in most cases illegible. While there are ways to make the images clearer, the optimization effort typically forces a sacrifice of the number of frames per second, a key factor in producing fluid motion in video. The effect, however, is for motion to appear less like video and more like fast changing images. Notwithstanding these quality issues, the inclusion of the caption text within the video display itself is further problematic in that the caption text covers a portion of the video screen. This portion of the video screen is typically the portion that is used for titles and any impromptu information that may be coming out of the broadcast.

In general, closed-captioning is primarily targeted at an audience that is hearing impaired. People that are hearing impaired are often also visually impaired. This audience is severely restricted in their ability to read caption text under current delivery scenarios. Accordingly, one goal was to separate the caption text from the AV stream, thereby increasing readability.

One option in developing a solution that got around known drawbacks was to use proprietary features of either Real or Windows Media. For example, Real has technology that enables the creation of a text track that can be media controlled using an industry standard media synchronization language, an XML based language called SMIL. There are a number of technical issues with that solution.

First, the implementation in Real has some quality issues in its inconsistent playback, as well as some delays in the beginning of the playback. This results due to the issue of not dedicating enough bandwidth for delivery of that information in their implementation. Additionally, the text in the visual display has very limited formatting capabilities as it needs to run within the context of the player. It also needs to be displayed in a dedicated box either next to the video or broken from the rest of the HTML. Thus, there is limited flexibility in how it can be displayed within the custom player.

One alternative would be to develop a plug-in for the RealPlayer and Windows Media Player. While this could accomplish a similar result, it would need to be deployed and installed on the computer of every person who views an event. Furthermore, the programming interfaces for both RealPlayer and Windows Media Player are different and would nearly double the authoring time.

Windows Media also has a built-in technology for captioning that's fairly old and doesn't have a lot of flexibility. This built-in technology also has to be played within the context of the Windows Media player so it can't be broken out and displayed in a customized way within the rest of the web page. In view of the above, a solution results that ends up looking different in Windows Media from Real.

As noted, one of the design goals was to be able to hit the largest possible audience and have the flexibility of the different formats. In accordance with the present invention, the custom player displays captions in the HTML using a combination of HTML code and images, and positions a caption box below the audio/video. The caption box need not be positioned below the audio/video but can be flexibly positioned based upon the needs of a particular implementation. Further flexibility is provided in its ability to change display characteristics (e.g., size of the caption box, font, font size, etc.) of the caption box.

Figure 1:
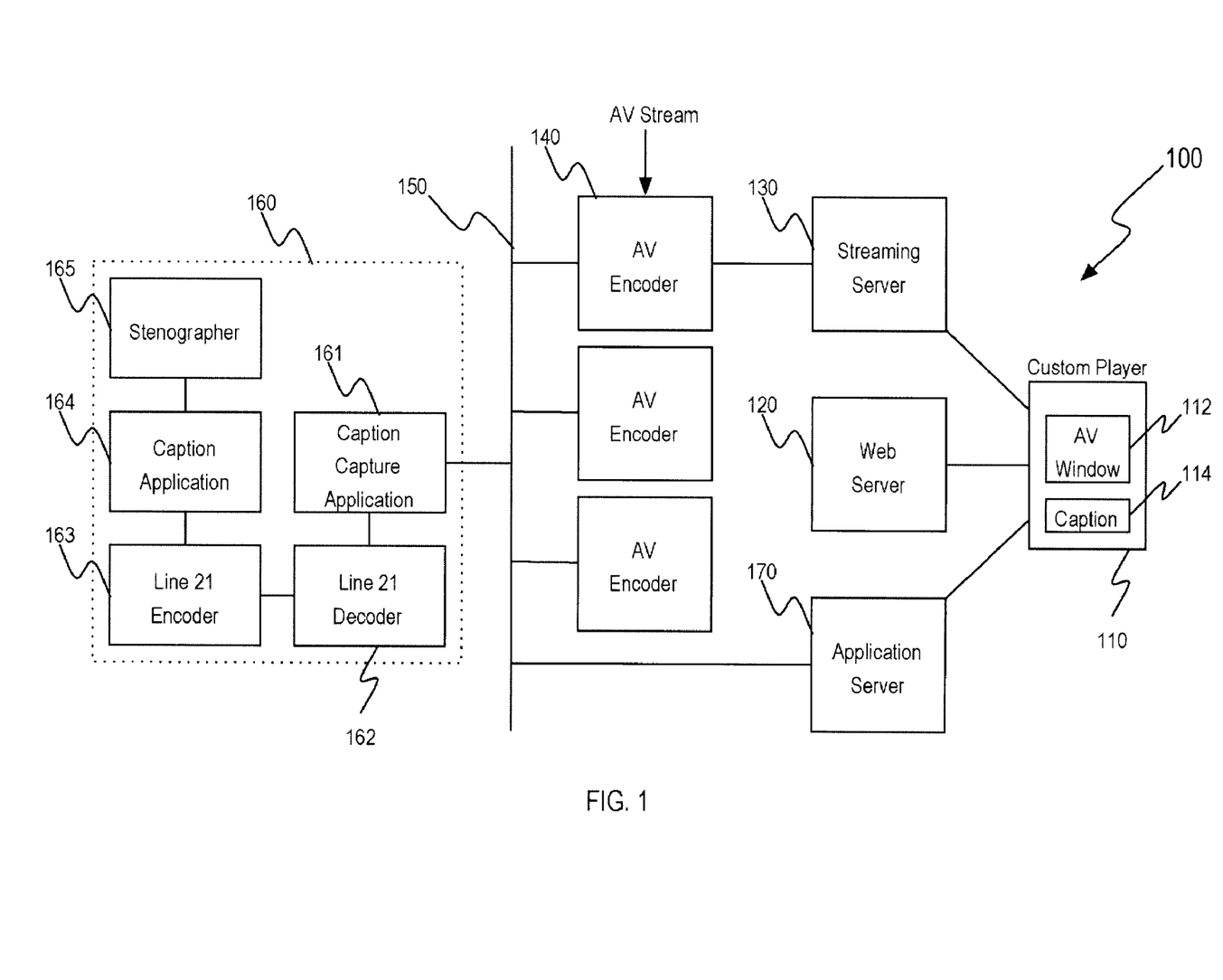
FIG. 1 illustrates an embodiment of a caption delivery system.

FIG. 1 illustrates a caption delivery system. As illustrated, caption delivery system 100 includes custom player 110. Custom player 110 includes AV window 112 and caption window 114. Custom player 110 can also include a toggle button (not shown) for toggling on and off the appearance and/or operation of caption window 114.

In general, there are two ways of viewing streaming media on a computer. A first option is through a stand-alone Real or Windows Media application. When a user clicks on a link to a stream, the Real or Windows Media player comes up and plays the AV content. A second option is to embed a version of a Real or Windows Media player within a web page. The placement of an audio and video box within a web page itself enables a browser-type user interface. In this format, the player being used is less apparent to the end user. The source code of the HTML, however, would include embedded code that points specifically to the Real or Windows Media application.

The HTML code and image that make up custom player 110 come from web server 120. In one embodiment, web server 120 is a static web server that simply serves up web pages. In an alternative embodiment, web server 120 is an application-based web server that dynamically generates HTML on the fly. As would be appreciated, the choice of the type of web server would be dependent on the nature of the application. In one scenario, preset HTML code is developed such that it can be copied and run in other locations.

In general, the custom player code is a set of web pages that is typically made up of HTML custom images and embed code that enables use of one of the media plug-ins (e.g., Real or Windows Media). In a lot of cases, the custom player code also includes some additional JavaScript code that ties all of that together to allow interactive functionality such as an image that, when clicked, provides play, pause or stop functionality for the player. The custom player code is received as part of the JavaScript code that's embedded in the HTML. In a sense, the custom player can be viewed as the whole package, where the JavaScript code is a component of the package along with the HTML.

The process for receiving streaming media in accordance with the present invention begins with custom player 110, which starts with a web URL being entered in a browser, thereby making a request for web pages. After the web page data is received from web server 120, the basic header information of the HTML document is loaded. Then JavaScript, which has a lot of the initialization functionality, will load. The JavaScript will be parsed and won't necessarily execute yet. The rest of the HTML document will load which will tell the browser it needs to retrieve the Windows Media plug-in and get ready to start playing a stream. There's a URL to a stream that puts in the parameters with the HTML code that tells the plug-in to open. As the request for the media begins, the JavaScript has also begun and is polling to see whether the stream has started yet. In one embodiment, the stream can be automatically started.

The plug-in itself is what makes the request out to streaming server 130 for the stream. It's the Real/Windows Media code that's actually making the request for the AV stream and handling the AV side of the transaction.

As illustrated in FIG. 1, caption delivery system 100 can include multiple servers: web server(s) 120 and streaming server 130. Web server(s) 120 are used for delivery of images and HTML code which includes JavaScript code and media player embed code. Streaming server 130, on the other hand, delivers the AV stream (e.g., a Real or a Windows Media stream).

In an on-demand setting, the AV stream is a file that resides on streaming server 130. The media player embed code would have the URL of that file and when playback starts, streaming server 130 would serve up bits of that file over the duration of the stream and it would be able to service it without any other parts of the system. That AV stream could just be the audio and video itself. As will be described in greater detail below in the context of on-demand delivery, the AV stream need not have any other flags or triggers or data embedded in the AV stream.

In a live setting, the stream file does not already exist on the system. Rather, the stream information is sent to streaming server 130 dynamically from AV encoder 140 that encodes the signal in real time. It should be noted that the embed code used by custom player 110 will still point to streaming server 130. It won't necessarily care that it's coming live. What needs to happen, however, is for the AV stream to be provided to streaming server 130, just ahead of where custom player 110 is.

AV encoder 140 provides the AV stream to streaming server 130. In one embodiment, AV encoder 140 is based on Real or Windows Media encoding technology. In general, AV encoder 140 sits on network 150.

As further illustrated in FIG. 1, caption delivery system 100 also includes caption capture system 160. Caption capture system 160 includes caption capture application 161, which is a computer application that obtains caption text that is provided on a serial port by line-21 decoder 162. Line-21 decoder 162 receives as an input an AV signal from line-21 encoder 163.

The AV signal provided by line-21 encoder 163 is a standard AV signal, not an AV stream but an AV signal that can be provided to a conventional TV. A broadcast AV signal includes standards for embedding captions within a broadcast signal. That standard is "line 21," which is the line of video in the AV signal in which you put caption data. This is what is used if you're receiving captions on a TV from cable, or satellite, or the airwaves using standard antenna. The caption data is embedded into the AV signal by line-21 encoder 163, which takes feeds from caption application 164. Caption application 164 takes real-time text from a stenographer machine 165. The link between line-21-encoder 163 and line-21 decoder 162 can be any available means of transmitting video. By using delivery technologies such as satellite of video fiber transmission, they do not need to reside in the same location.

The operation of stenographer machine 165, caption application 164, line-21 encoder 163 and line-21 decoder 162 are well known in the broadcast industry. These processes are part of a well-developed and standardized industry for providing captioning solutions. It has been done for a long time and provides highly accurate caption output. In accordance with the present invention, standard hardware and software and dedicated talented labor can be leveraged by using an off-the-shelf line-21 decoder 162. As would be appreciated, line-21 decoder 162 can be either a hardware or hardware and software solution.

It should further be noted that the various elements of caption capture system 160 need not reside in the same location. Their grouping in FIG. 1 was selected for purposes of illustration. Indeed, in one embodiment, caption capture application 161 and line 21 decoder 162 reside in a separate location from stenographer machine 165, caption application 164, and line 21 encoder 163.

Figure 3:
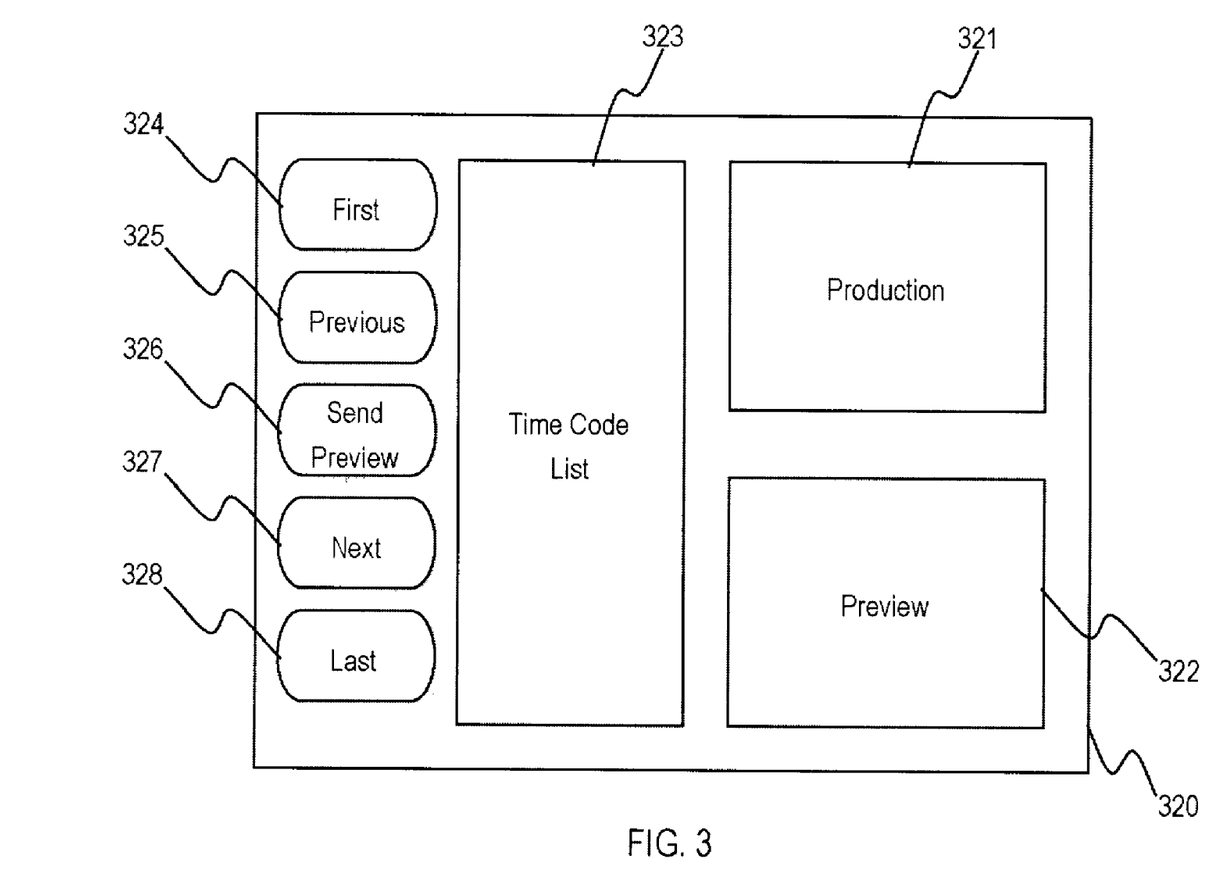
FIG. 3 illustrates an embodiment of a slide encoder.

As illustrated in FIG. 1, line-21 decoder 162 sends line-21 text data to the serial port of a computer running caption capture application 161. Caption capture application reads the ASCII text and sends it to AV encoder 140 via network 150. AV encoder 140 runs software by slide encoder 320 to be described below in further detail.

AV encoder 140 is used to synchronize this ASCII text with the streaming AV. AV encoder 140 is a network-based application that can serve as a network client or a network server. In one embodiment, caption capture application 161 provides the ASCII text to a plurality of AV encoders 140 that are assigned to a particular event. To facilitate this process, an XML-based configuration file is used to identify the set of AV encoders that are assigned to the event. Once identified, caption capture application 161 knows the set of AV encoders that it needs to send ASCII information to.

Here, it should be noted that AV encoder 140 has significant flexibility. AV encoder 140 can receive an AV stream from a separate path as compared to caption data. It's fairly typical to handle captions separate from a master program feed. So, depending where stenographer machine 165 and line-21 encoding broadcast gear is located, the caption data can be received on a different path as compared to the AV stream. This can be true even though both are happening in real time or very near real time, meaning millisecond delay. There are some delays that are natural delays. Obviously, the stenographer in a real-time situation is listening to the audio as it happens and responding as quickly as possible. So in that sense, the system may operate only as well as real life enables. Meaning if someone was watching it on their TV, they would have the same issues because the stenographer is not clairvoyant and in fact has to hear the words before he or she could type them.

In one embodiment, AV encoders 140 are listening on network 150 using standard TCP/IP sockets. In addition, caption delivery system 100 provides a basic XML document type that we call a request, but this could be replaced with any other networking technology. Each of AV encoders 140 has interface elements. AV encoder 140 takes the network request, which then triggers the code to read that request, which then determines that it is a caption type request. At that point AV encoder 140 knows that it needs to format the information in a certain way.

In accordance with the present invention, AV encoder 140 encodes the URL with caption text that is received from caption capture application 161. In this manner, the encoding produces a string that appears as a URL, but that includes the caption text to be displayed in caption window 114. Once the text string is encoded into URL format (in this case it's not streaming encoding but URL encoding) the URL is written to the audio/video stream using the Real or Windows Media API.

In this case, the URL event that has been encoded to include caption text is sent to the Real or Windows Media API. In effect, AV encoder 140 requests that the URL event be inserted into the AV stream at a particular point such that the caption text will be provided at a point proximate to the relevant audio content in the stream. The AV samples are therefore sent along with the corresponding encoded URL to the server all at the same time.

At that point, the AV stream with the embedded URL events has been handed over to the standard part of the process where Real and Windows Media take over. This technology delivers the stream to streaming server 130, which then delivers it to the AV player embedded in custom player 110. At that point, in a live situation, custom player 110 is not allowed to handle the URL event in a typical fashion. Rather, the URL event handling in custom player 110 is short-circuited. Custom player 110 does not go out and look for the URL event since it isn't really a URL. Rather, it is a string of data that includes the caption text. In effect, custom player 110 is tricked. At this point, a decoding converts what appears to be a URL back into caption text, which caption text is displayed in caption window 114 of custom player 110.

With live events, an instruction is put into a specific point in the AV stream to tell custom player 110, which is essentially a web page, to take some activity at that time. The instruction is like a "flag" of some sort. In a conventional example such as a slide change, when custom player 110 gets that instruction it goes out and retrieves an image from a web server and displays an image next to the audio and video.

In the caption example, the URL event includes, in effect, not only the instruction of what to do, but also the meat of what to do in the AV stream itself. More specifically, instead of just putting a flag that instructs custom player 110 to get and display a particular file, the actual text that makes up the caption is also inserted into the streaming file. Thus, the Real and Windows Media API URL event functionality is encoded in a specific way to increase the functionality of custom player 110. Whenever a URL is written to the live stream it is also written to a log file to be used in generation of the on-demand version.

Significantly, no special upgrade or version of Real or Windows Media players is necessary to operate in accordance with the principles of the present invention. Moreover, standard client-side functionality such as Java and JavaScript is also leveraged.

In captioning, due to the nature of the way stream files function, on-demand events can be harder to implement than live events. As noted, standard technology that ships with Real and Windows Media enables the embedding of instructions (i.e., URL events) to tell the browser to go out and get a new slide. That's a standard part of the API. When this API technique was employed in an on-demand delivery solution for encoding caption text into the URL, problems were encountered. The way the technology stores those events in the stream file makes it impractical. Technically in most cases, it will play back if you wait a long enough time, but the start times were impractical in the sense that it could take seven minutes for a four minute clip to start playing. This delay would be unacceptable for a typical user.

Accordingly, in an on-demand setting, data that previously was included in the stream itself was placed in player code. In this case, the event data is included in JavaScript code sitting in the HTML, which lives either in a static file or is built dynamically from the database. When the browser starts up it creates a thread whose responsibility is to constantly poll to see if the media player is running and if it is, then to start checking time codes. If the player is not running then nothing really happens. The custom player code is designed to sit and wait until something's running. When something's running, then it queries the media stream and finds out its current position and then determines if one of the time codes, previously listed, needs to be acted upon. In the caption context, the action that needs to be taken is the display of caption text within caption window 114. These actions can be specified to occur at particular time codes, which are being monitored by the client-side resident JavaScript code.

When using a video feed with line-21 data during an event, the caption capture application 161 samples the incoming text one to four times per second. This results in frequently changing data in both the live and on-demand event. However in the on-demand setting, the text could be grouped into multiple sentences and changed once every ten to twenty seconds. This can reduce the constant motion of the text, which makes the words slightly harder to read.

In general, the specific technique for delivering captions in an on-demand context can be extended to a general class of media-triggered events. Examples of other media-triggered events include the sending of a web page, the sending of a polling (e.g., a dynamic web page to ask a question of the viewing audience), the changing of elements on the web page (e.g., where an agenda is displayed and the current speaker's name is dynamically changed to appear in bold), starting and stopping, wherein you could literally send a command that says stop (for a variety of reasons), popping up a web page with other functionality (e.g., a feedback form appearing at the end of the event that allows the entry of user feedback and submission to a database). Here, media-triggered events can be sent that causes the form to appear to the viewer, thereby increasing the response rate of filling out feedback forms. And then obviously captions are also media triggered events.

This general class of media-triggered events enables a variety of benefits that extend beyond the delivery of captions. One of the big benefits is that it enables the streamlining of the process of delivering on-demand media triggered events.

Previously, what was required was to take the list of time codes, make sure they were correct, apply the time codes to the stream file and then deploy the custom player code, which is the web pages, with the stream file. Now, however, the time codes can be placed directly into the custom player without having to manipulate the stream file. The stream file can be provided as is without any time codes embedded in it. While the time codes still need to be placed into the custom player code, the custom player code is a lot lighter weight, a lot more portable, and can be dynamically generated using standard techniques such as text generators. As would be appreciated, various programs can deal with and generate text files, but it is difficult to write programs to generate stream files.

Stream files, on the other hand, are big and bulky and hard to move around. They take a long time to transfer from one computer to another. This is certainly true if it is being transferred on the Internet over slow bandwidth. It is therefore a great benefit to be able to place a media file on a server and never touch it again.

An additional benefit is that you can have multiple custom players that have different sets of time codes, each using the same stream. This is significant because under previous techniques, the duplication of large stream files would incur additional disk space. As noted, this process was very slow. Thus, what is gained is speed and flexibility.

Having described the framework of handling media-triggered events, an embodiment of AV encoder 140 is now described. There are two applications that feed into custom encoding. One is an on-demand tool that has two purposes. First, it allows the user to set up events for on-demand viewing. Second, it serves as a setup utility to configure files for live events. This on-demand tool is referred to as a slide file manager (see FIG. 2), which enables the creation in advance of configuration files. Please note that the slide file manager and the slide encoder are different applications.

While the slide file manager has various pieces of functionality, the ultimate goal of the slide file manager is to create an XML file that can be used for media-triggered events. It should be noted that while the term slide is used the principles of the present invention are not limited to slides. As will become clear in the following description, the functionality in the slide file manager can be applied to various types of media-triggered events.

The slide file manager application has a couple of different outputs that it can provide. One output is a media mark-up language (MML) file. The MML file has been developed in accordance with an XML format useful for configuring media-triggered events. Defined media-triggered events have elements such as description, URL, target and time code. Here, target is the location where we want the activity to happen. For example, the target attribute can refer to a frame of an HTML document where we want the information identified by a particular URL to be displayed. In another example, the target attribute of caption can refer to caption window 114.

The slide file manager exports to the file formats that the proprietary encoding formats need. Both Real and Windows Media have specific text file formats that specify a list of media events. Real and Windows Media tools can then be used to take a stream with the relevant text file to produce a Real or Windows Media stream that has the media events embedded in it. By creating a common format, media-triggered event specifications can be performed once in an abstraction that enables the subsequent creation of format specific code.

The other export side of the slide file manager is what is accessed when client-side media-triggered events are used. Here, the slide file manager generates the JavaScript code that is to be included into the web page data that is downloaded to a client.

In various embodiments, information that specifies the attributes of the media events can be stored statically or be dynamically generated. If the information is dynamically generated, then all the users of those files would have the immediate benefit of updates. So rather than having to pre-produce everything, everything can be dynamic. For example, if a URL event is changed by the change in value of a time code, this change can be retrieved from a database when the web page data that has the list of time codes is dynamically generated.

In summary, the export side of the slide file manager includes the MML file itself, the Real or Windows Media text file, which can be used with the Real and Windows Media tools and/or any other format that is selected. For client-side media-triggered events, the export side also generates the JavaScript code needed by custom player 110.

The import part of the slide file manager is now described. Here, the list of media-triggered events can be generated quickly through the automated loading from a directory. For example, assume that a list of 25 files resides in a directory on a local computer. Through the identification of the local directory, the program automatically reads in all the files. In this process, it takes the full file name, drops the part of it which is specific to the local computer, adds the text of where the location of the file would be once we deploy those slides out to a public web server and stores them into the media file. As an example, slides 1-25 can be represented in a list such as http://www.streampipeevent1/slide1.gif, slide2.gif, etc. Thus, the slide file manager is automating the process of building a configuration file for the slides.

Another time saving technique that the slide file manager tool allows is the ability to import caption text. This would be used when we have a transcript, but we don't have a time coded version, as we would from the log file of the slide manager. The slide file manager will then be called upon to convert the transcript into a format that enables time coding of the transcript. Initially, the plain text is converted into caption text. Generally speaking, caption text includes short lines of text that can be displayed in a viewing window that typically doesn't exceed more than 4 or 5 words. The slide file manager includes a parser that takes the text from a document, and breaks the text up into lines of captions. Time coding is not yet associated with the broken up text. Rather, the parser, at this point, just creates entries and assigns a URL and a target. In the case of the slides, the target is set to the slides window and in the case of captions, the target is set to the caption window.

In one embodiment, the slide file manager tool is also designed to retrieve information from other sources. For example, the slide file manager can be designed to import other documents such as a spreadsheet document (e.g., Excel file) that includes time-coded lists in some format. This time-coded list can then be converted into MML format. For example, assume that a customer knows the time code for the seven slides in the presentation. Such a customer need not know anything about MML. The customer would simply provide the slides in some predetermined format indicating the times in a spreadsheet file or in a text file (e.g., comma delimited format). As can be readily appreciated, it is within the scope of the invention to bring other file formats into a common format that has all the attributes needed to successfully deploy in all the various output types.

Time codes need to be assigned if they are not provided with the list of media-triggered events. While these time codes can be manually assigned and changed, the slide file manager also enables the automation of the process of time coding. In this process, the slide file manager provides hooks into the playback functionality of the media formats, such as Real, Windows Media or any other format that could be implemented. On-demand files are typically stored in a common location on a particular server. Menu items in the slide file manager that are designed to open a Windows Media file would then default to that server.

Figure 2:
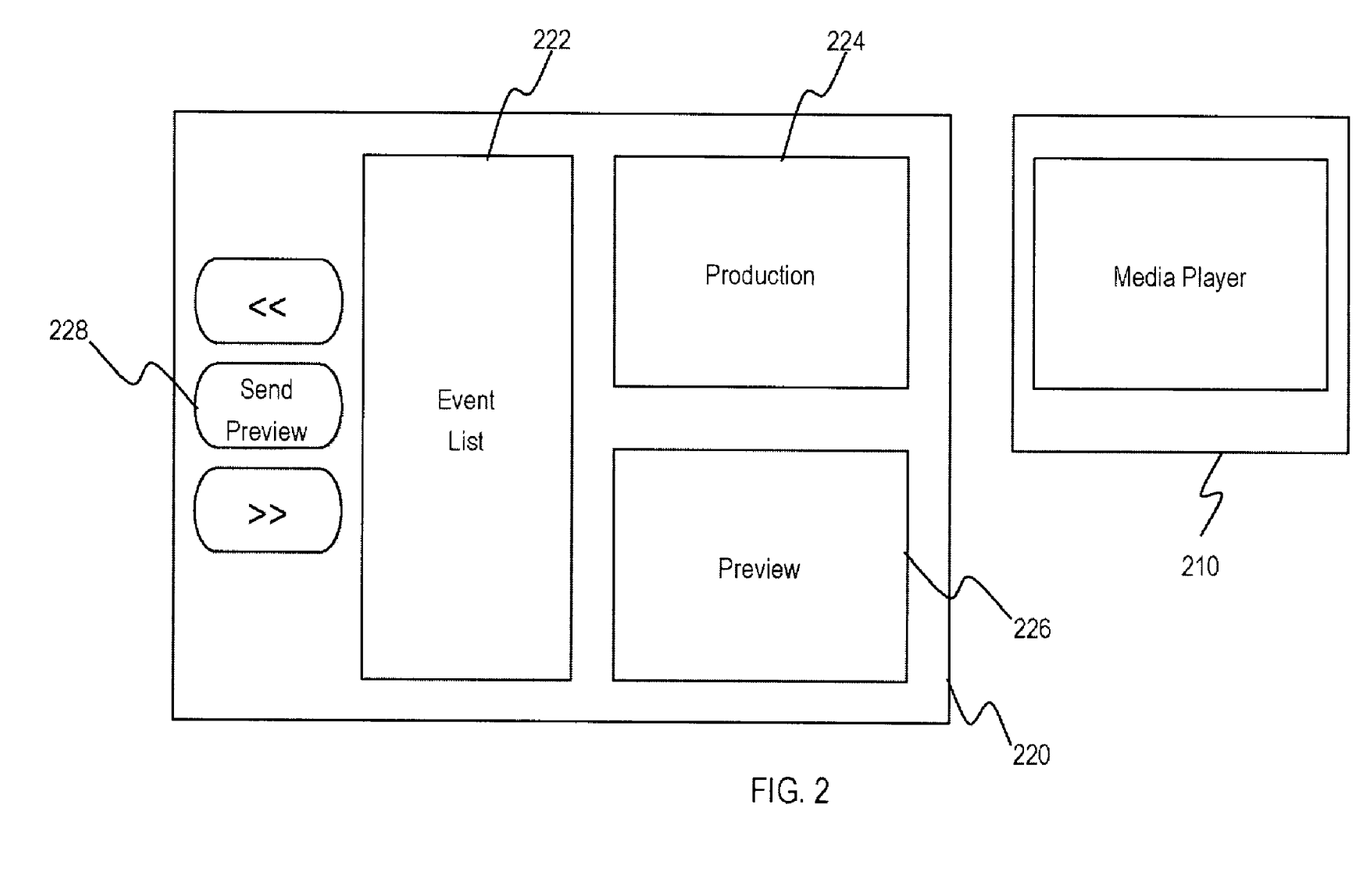
FIG. 2 illustrates an embodiment of a slide file manager.

For example, a user would first navigate and select a Windows Media file. As illustrated in FIG. 2, the Windows Media file would then open up in media player 220 next to slide file manager 220. Here, slide file manager 220 includes a list of media-triggered events 222 that is to be associated with the media file opened in media player 220. The list of media-triggered events 220 appears along side production window 224 and preview window 226. In one example, each of the media-triggered event listings can be a slide, such as slide 1, slide 2, etc.

The slide that is to be assigned a time code appears in preview window 226. After media player 220 begins playing the media file, the user waits for the particular point in time at which the slide in preview window 226 should appear. As soon as that time arrives, the user hits send button 228. Slide file manager 226 then updates the time code for that slide to be whatever the time code was when send button 228 was clicked. The slide in preview window 226 is then moved to production window 224 and the next slide to be assigned a time code appears in preview window 226.

What's been stored is a text entry that includes the link to the slide or the pointer to that slide and the time code. The Description field is defaulted to the filename without path information. The URL field would be the place (publicly accessible URL) where someone who's running custom player 110 would find the file from their system. Typically, the URL points to a web server. In other scenarios, the URL can point to a local storage volume such as a CD. The Target field, which would indicate the type of URL, is the information that tells custom player 110 how to handle the event. For example, the Target field can identify a slide window, a pop-up window, a caption window, etc. Finally, the Time Code field identifies the time code at which the event should take place. As further illustrated in FIG. 2, slide file manager also includes fast-forward and rewind functionality that enables the user to insert the slide at the proper time.

In a caption context, the use of slide file manager 220 is also compelling. After the text has been broken into lines of captions, the user can view the captioned text in preview window 226. After the caption phrase is heard in the audio component of media player 210, the user can simply hit send button 228. If the user wants the caption text to be faster than the speaker, then send button 228 can be pressed when the first words are heard. Alternatively, the user can have the caption text lag the speaker. The user is given great flexibility in how the caption text is synchronized with the speaker. While this process requires attention and concentration, it can be performed substantially in real time.

In general, slide file manager 220 can be described as an editing tool that enables a user to preview events and send the preview to production. When send button 228 is clicked to send a particular media event to the media player, a time code will then be associated with the media-triggered event. Slide file manager 220 is a very powerful tool as it enables the creation of a configuration file in a standard format. This configuration file can be output to any one of the output formats and subsequently applied to a media stream as standard URL events. Alternatively, the configuration file can be used to generate JavaScript code for use by custom player 110 as client-side media-triggered events.

In addition to slide file manager 220, a slide encoder is also provided that can be used for live events. This live tool extends the encoding tools of conventional technologies such as Real and Windows Media. FIG. 3 illustrates an embodiment of a slide encoder.

As illustrated, slide encoder 320 has a similar interface to slide file manager 220. Slide encoder 320 includes production window 321 and preview window 322. Additionally, slide encoder 320 includes time code list 323 for the same elements included in the MML file. Slide encoder 320 further includes navigation buttons including, send button 326 that sends a preview to production button, and four other buttons 324, 325, 327, 328 that allow the user to change the current preview position. Specifically, the user can choose to preview the first entry, the previous entry, the next entry, or the very last entry. Slide encoder 320 also enables the user to click on an element in list 323 to preview that entry. When the user selects send button 326, slide encoder 320 outputs the event to the media API. This interface ties together the functionality for both Real and Windows Media in the exact same manner, leading to efficient training of operators in performing the required tasks.

The primary functionality of slide encoder 320 is importing an AV feed and exporting an AV stream. It is typical of industry media encoders to have a video capture card in a computer for receiving a video signal. The Real or Windows Media encoders read uncompressed audio and video information from that capture card and compress it into their proprietary media formats. Whatever format is chosen, their tools allow the user to specify how they want to digitally compress it. The result of the compression is an AV stream. These are standard functionalities that the media encoders provide. These proprietary formats allow a programmer to embed that functionality within their own application by exposing their API. This enables the development of an application that provides common functionality and graphical interface using different media formats.

The first thing that is done is configuring the encoder. Here, configuration data is defined to set up the properties of the encoding tool. This configuration data is written to the API that supports various properties, such as the server we want to send the stream to, the format we want to use, the bit rates we want to support, whether we want to encode for modems, whether we want to encode for network locations, image size, etc. The properties of the AV stream itself are set by coding to the API using the configuration file. Alternatively, the properties can be set using a GUI interface. As would be appreciated, this process can leverage the standard configuration files supported by both Real and Windows Media.

A description of the process of inserting media events into an AV stream is now provided. In general, slide encoder 320 enables the loading of a MML file that brings in the list of media events. These media events can be previewed within slide encoder 320 and sent into production, wherein the media event information is written to the API of the media format that is being used for insertion of the media event into the AV stream.

More specifically, this process begins when the encoder is running and you have an AV signal being converted into a stream that is going to a stream server. The MML and configuration files are loaded thereby resulting in the display of a list of events, such as a list of slides, in slide encoder 320. The first event defaults in preview window 322. When send button 326 is selected, the first event in preview window 322 would be visually moved to production window 321. In this process, slide encoder 320 inserts the first event into the stream by writing to the API.

In this process, the event information includes a target and a URL. The target information informs the decoder where to put the information and how to deal with it. The URL essentially identifies the data. For example, a target of "slides" would signal a slide change, and the URL field would identify the location of the slide. Slides can be implemented by using an actual URL, or in an alternative embodiment, custom code can be provided that would enable recognition of codes such as "1", "2", "3" and "4".

Once a slide is sent to production, a media event is inserted into the stream and slide encoder 320 will move the slide from preview window 322 to production window 321. Preview window 322 is then moved to the next slide. At that point the user can continue to "send preview" or have the option of previewing other slides by using the provided navigation buttons or altering the position of the preview. This process is referred to as manual mode.

It should be noted that the previous description was with respect to a live situation. Slide encoder 320 actually supports three different states, live to server, save to file or both.

Slide encoder 320 is designed for ease and quickness of use. A user can click on the list 323 and/or use the navigation buttons 324, 325, 327, 328 to preview a particular slide. In a live event, there are times when the next slide is not the appropriate slide, for example, when a presentation has finished and a panel session has started. If no slide has been prepared for the panel session and the next presentation has not yet started, a generic slide with the name of the event may be desired. Often, this generic slide can be positioned as the first or last slide in the list. Navigation buttons 324 or 328 would then be useful to quickly pull up the appropriate out-of-sequence slide.

In the manual mode, the encoders are turned on and slides are selected and sent. Additional modes beyond the manual mode are also supported, such as start mode, slide mode, and network mode.

Network mode can either be none, child, or parent. None is fairly simple and means no network is involved. It is not listening on the network and it's not sending anything out on the network. A device configured in this manner is not listening on the network nor is it putting anything out on the network when it takes activity. It is just operating as is. It adds events to the media stream, but doesn't have any other networking implications besides sending the AV stream across the network.

In parent mode, any activity extends on to any of the children encoders listening on the network. The list of encoders including the addresses on the network is added to the MML file. One encoder is denoted as the parent and the others are denoted as the children. If a slide is published on the parent, then a message will also be sent to all the children encoders requesting that the same slide also be published. This permits the entire system to be run more easily with one operator.

In child mode, which is slave to the parent, the encoder is sitting on the network with a networking port open. In one embodiment, the encoder implements TCP/IP sockets sending and receiving XML messages. In another embodiment, technologies such as SOAP or other technologies could also be used. In yet another embodiment, server side Java could be used to open a socket and send text. In general, the devices are communicating across the network and their network locations are included in the configuration file.

The encoders essentially handle themselves once they are configured and started. At that point, control has been handed off to the Real or Windows Media engine behind the scenes. The encoder stands by awaiting interaction from the user concerning whether to start, stop or send a media event.

It should be noted that a parent encoder is also listening for other applications that are feeding the encoders information. For example, in the caption context, the parent is taking a feed in from caption capture application 161 and doing a conversion on its own. While interface functionality can be provided to enable typing in of a caption, general production use is to configure it and let it run on its own.

In general, caption capture application 161 will send out caption information to all network nodes that have networking turned on. Thus, even though an encoder is running in parent mode it is also running the network client functionality. Parent mode therefore relates to what is driving the slides. If the encoder is set to the network mode of none, then caption capture application 161 will not be able to send the encoder any caption information because networking hasn't been turned on. One reason for having network mode of none is to leave as little functionality in the program as possible to get the job done because the more moving parts the more likely something will break. The network mode of none also allows you to lock down the encoder from a network attack as best as possible.

Slide mode and start mode are now described. These modes were created to support both manual operation and scheduled operation. If you have the benefit of knowing the time codes in advance, the user may just want to cue it up and let the computer control the publishing of the media events because the computer can control the process at the sub-second accuracy level. This may be important for things like simulated live events where the event is being presented to the viewing audience as live, but in reality the event was produced and stored on tape at a prior date. Here, the tape is played and the resulting video signal output is used instead of a live feed from a camera somewhere. In that case, the slides are known in advance and the time codes can be pre-configured using slide file manager 220. Once everything is cued up, all that is needed is to make sure that the time code list starts at the right time and that all the time codes are accurate. This is where start mode and slide mode come in.

Both start mode and slide mode have two options: manual and scheduled. If operating as networked children, then triggers can also be received from the network. Slide mode and start mode are set in the header part of the MML file.

Slide mode generally refers to the activity that is going to prompt the media events. In manual, the activity is clicking on the set of preview buttons. In scheduled, it's the computer checking its clock and determining the time code at which the media event should be sent. In network, the application is listening on the network for its parent to send it a slide change.

The application has a feature called the show time, which tracks the when the event really starts and how long it's been running versus when the encoders were turned on. Encoders can be turned on 15-20 minutes before an event starts. The activation of the encoders does not really signal when the event starts. Let's say the event starts at 2:00, and the encoders are turned on at 1:45. The show time is when the event really started, for example, when the person stepped up to the podium and started speaking. It is desirable to make sure that the show time starts from zero and starts counting up at the appropriate time. Start mode is the manner in which the show timer starts. If it is set to scheduled, it starts based on a time set in the configuration file. If it is set to manual it starts by clicking on the button that says "Start Show Timer."

Alternatively, it can start scheduled, for example, by starting the show time code at 1:00. That's what start mode is for. If the start mode is scheduled then a start time is also provided. So, if it is scheduled then you can have a current time display clock and a countdown clock that counts down to the scheduled time. You can also have a show time clock that will begin when the count down has reached zero.

In one embodiment, a timer is also provided by the network. For example, assume you have four encoders set up with a parent and three children. Regardless of whether it is manual or scheduled, the parent is the one who determines the start time for the children. As soon as it starts, the parent sends a request to all the other children encoders instructing them to start. That way all encoders are synchronized with one action. Then the actual individual time codes of each slide have three options. They could run either scheduled or network to make sure they are all in sync. Additionally, slides can be run manually if needed.

Another feature of the slide mode allows the user to change modes and then change back. This can be especially relevant if you are in a scheduled situation and need to deviate from the schedule for a period of time, but not for the entire event. For example, this situation could occur if the time code list was wrong and it was recognized during the live event. Here, the user would want to be able to deviate from the schedule to bypass or correct the error without being on the hook for manually pushing the rest of the media events. Thus, from network mode or schedule mode you can switch to manual and operate. This provides a very important backup process where people at the encoders can step in if something goes wrong on event setup.

All the encoders, as they are sending media events, are writing to two log files. One is a system log file, which is a standard log file that stores status information and error events. There is also another log file that is very specific to media events and captures the activity that happens on the computer. This ensures that when the on-demand version or the archive version is needed the event does not have to be watched again. No additional work is required because the events have already been written out in XML format, which is then ready to go in the MML file for the on-demand event.

We now have the time-coded list in the proper format already to go into the on-demand version. This enables the automatic publishing of the on-demand version. As soon as the live event ends it can be published. One of the encoders could have been set up as the archive version, so instead of sending it to a server it's job was just to publish the file. It can either apply the media events into the stream or it can generate the player code or update the database with the appropriate time codes. That provides us the way to automatically deploy a stream that includes all the complicated media events of the live event.

It is a further feature of the present invention that captioning can be extended to include the delivery of a live transcript. As described above, captions are provided in real time as part of the AV stream. In conventional captioning solutions, text is delivered to the user as part of the viewing. The user would then be required to sit in front of the screen to view the caption text as it appeared in synchronization with the playing of the AV stream. In this conventional environment, the user cannot gain access to caption text that appeared prior to that user's start point in viewing the AV stream. Thus, if a user comes late to an event, the user would be unable to see all of the text that has previously transpired in that event.

In accordance with the present invention, the user is also provided with a link that enables access to all or part of the caption transcript. In various embodiments, this transcript can be designed to appear in a separate web page or in a particular window of custom player 110. The extent of the transcript is based on user control. For example, the user can choose to view the entire transcript since the event began, the last N seconds of the event, a particular window of time in the event, etc.

In one embodiment, the live transcript is stored within the memory of application server 170 (see FIG. 1) that is configured to dynamically serve the live transcript. The transcript text is also stored in a time-coded way so that when specific requests for portions of the transcript are made (e.g., the last N seconds) application server 170 is able to retrieve the relative transcript portion from memory. In one embodiment, application server 170 is coupled to network 150 like any other node. During a live event, caption capture application 161, in addition to sending caption text to AV encoder 140, also sends the caption text to application server 170 for storage. Application server 170 can then forward all or part of the caption text transcript upon request.

In one scenario, the request for the caption text transcript is received from custom player 110. Here, custom player 110 enables a user to get up to speed with the desired portion of the event that they have missed.

In general, the availability of the caption text transcript provides a way for users to experience the event even if they don't have the means to fully support the AV stream, for example, where the user has a system that does not support all of the features of custom player 110. Specifically, the user may not have a media player or plug-in part of the media player that is configured correctly. Even without the ability to fully support an AV stream, the user can still gain access to the transcript portion of the media content.

This feature of the present invention enables the delivery of content to new audiences that are unable for some reason to run custom player 110 or even a conventional media player. Since all or part of the transcript text can be retrieved on-demand apart from the retrieval of an AV stream, users can retrieve media content using other devices that have not traditionally been used in the streaming playback environment. For example, wireless devices (e.g., phones, PDAs, etc.) can be used to remotely retrieve transcript text when the user does not have sufficient wireless bandwidth or does not have access to a capable media player. In general, any device that is coupled to the network can be used to retrieve transcript text.

As described above, the transcript text can be stored on application server 170. In an alternative embodiment, the transcript text is stored on a web server. This web server would then permit access to the transcript text through any browser using standard HTTP requests.

Another feature of the present invention is the ability to track the amount of time that a user has watched a particular event. In previous solutions, the users that requested a custom player page could be tracked, but that information could not be used to determine whether those users actually received the AV stream. In other words, those solutions were confined to logging at the application level and simply provided information as to when the page was served. It could not provide information as to whether the user had the plug-in code and whether or not it actually played. It is therefore recognized that there is great value in being able to inform a client regarding the number of people that watched a particular event and the amount of time that they watched it.

In accordance with the present invention, information is gathered through the use of tokens that are generated and sent to users as URL events. These URL events are added into the stream (live or on-demand) at configurable intervals (e.g., 30-second intervals). These tokens get captured at the player level like any other URL event.

In one embodiment, these tokens include the encoder ID, the time the token was created, and information regarding the specific event that the users are watching. When the player gets the token (behind the scenes without the user knowing), the custom player makes a request to the server that the user has received the token. This request also includes information as to the time the player received the token. The server then logs this request.

This request is associated with a user since the user has previously registered and the user's session has been identified and tracked. In one embodiment, the user's session is identified and tracked using cookies. As would be appreciated, there are many other methods that can be used for session tracking without departing from the scope of the invention. If a session is being tracked, then the system knows that the request is coming from a player that is associated with a registered individual. In another embodiment, the user's session is tracked using session information (e.g., authentication or registration information) that the player has included in the request. Another method for duration tracking would be to add code that checks the status of the player at determined intervals (e.g., every 0.5 seconds) and to set a timer to commence as soon as the player begins. As long as the status check shows the player continuing to play, the "stopwatch" continues to run. Once the user exits the player, the cumulative time count is then sent to the server for logging. This minimizes client server communication and hence server load, and also accounts for when the player has been paused and subsequently restarted.

The ability to track user sessions is significant when compared to conventional tracking methods. Traditional streaming environments use the streaming log files. The streaming log files don't provide good information as to unique users because a lot of users are presented as coming from the same IP address, which is associated with a firewall. In some cases there is a unique token that is part of the configuration of the browser, but people can turn that off. Thus, reliable unique information does not exist in the log to say one person is different from another person.

Additionally, it should be noted that the system could also track the time that the player received the token. This information is useful to determine the buffer between when the media is actually converted into a stream and when the user viewed it. This information is very valuable because it also provides a quality of service metric.

Finally, there is also utility in knowing which encoder the stream came from. For example, in one embodiment, streams are served using a redundant encoding technique that is based on back-up encoders. In other embodiments, multiple encoders are used to serve the event from multiple servers at once. In these various delivery scenarios, it can be important to know such things as whether the system has fallen over to back-up encoders, or whether a load-balancing scheme is functioning properly. The collected information helps to fill in the gaps of what really happened beyond what we can be discerned from the log files. In general, servers can be watched to determine how many people were on a server associated with a particular encoder. This monitoring can be taken one step further such that information is collected down to the user level, thereby enabling an assessment of quality of service issues for individual users.

In this framework, when someone calls and says that they couldn't get on to the system, the collected information can be used to develop an accurate picture of the viewing experience. Here, a sample response could include information regarding the viewing activity of that particular individual, for example, the encoders that the user was on, the status of the network, the collective viewing experience of the viewers of that event, etc. This type of information is extremely valuable when addressing concerns of paying customers.

Reliability of service and constant upgrading poses significant challenges when providing technology services to multiple clients from a centrally hosted environment. Furthermore, it is advantageous to build a platform that allows considerable flexibility from client to client and from job to job for those clients. Finally, that flexibility should come through the reuse of code and only customizing client media assets (e.g., graphic image) when necessary. The core components, used in conjunction with one another, which enables these goals to be met, include application versioning, version traffic cop, global hierarchy, version subscription, modules, hierarchical module configuration, and hierarchical data.

Application versioning enables the division of a centrally hosted platform into a single master application with multiple versioned applications. The versioned applications implement the business logic of the programming task at hand. Starting with a single versioned application such as version number 1.001, additional features could continue to be added while not making significant changes to existing functionality, with the exception of fixing bugs. Once the point is reached where features need to be changed, it's time for a new application version. Version number 1.002 is then created. A few months later, version 1.002 is left behind and version 1.003 is created. Obviously, the period of time between versions depends on rate of development and the need for significant changes. The principal business driver for this system is a high rate of change in business requirements and technology implementations to meet those requirements.

Application versioning can be applied to many applications if each subsequent version is built with the appropriate consistency (or if efficient upgrade tools are created). In accordance with the present invention, application versions are tied together by a master application. Here, the master application is called version 1.0, which brings together all the 1.xxx versions, thereby presenting a single system from the users' perspective.

The useful life of the master application is designed to be multiple years or decades. The more discipline that is applied to forcing the implementation of business requirements into application versions, the longer the master application will live.

Figure 4:
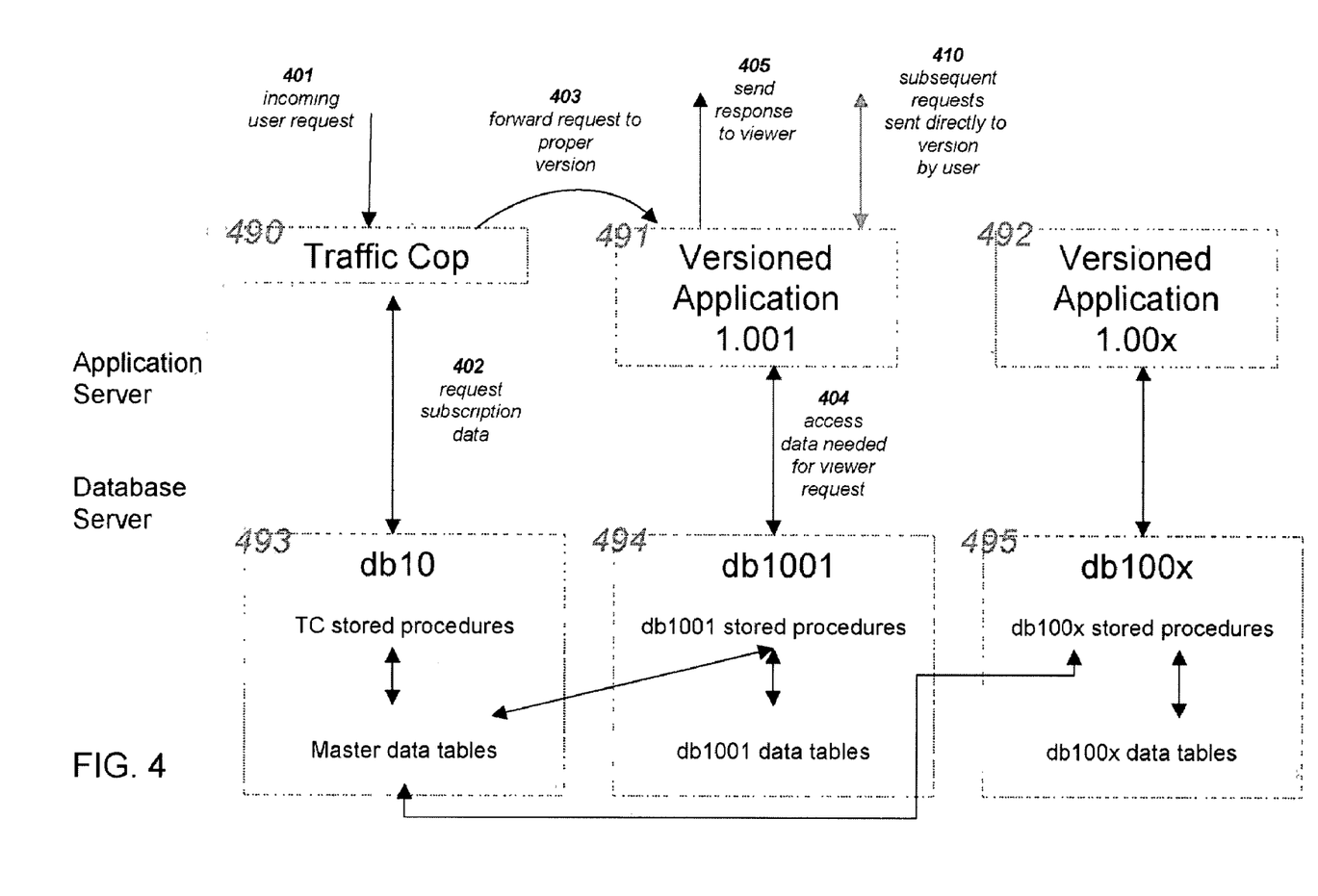
FIG. 4 illustrates a relationship between the master and versioned application servers and databases.

As illustrated by FIG. 4, the only application code associated with the master application (1.0) is traffic cop 490. Versions 1.001 and 1.002 have separate code, versioned application 491 and 492, respectively. If additional versioned applications existed, they would have their own code. All these applications operate on a single logical platform. A single database is created for each application, version db1001 as shown by 494 and db1002 as shown by 495, with an additional database, db10 as shown by 493, for the master application. The application code of each version accesses both its corresponding database and the master database at the same time. For this reason, databases are implemented on a server that allows joining data on the fly across databases. In one embodiment, each application version calls database stored procedures in its respective version database. If an application needs data in the master database, the stored procedures in the versioned database will access it. This allows the master database to remain free of code related to the application versions. Furthermore, in the unlikely event that a table in the master database needed to be changed, the stored procedures in each version database can provide translation so code on the application servers for each application version remains unaffected.

Except for the code found in stored procedures in the database, all the code runs on application servers. Refer to FIG. 4 to follow the functional use of the traffic cop 490. An initial request 401 to the application comes to the traffic cop 490 first. The traffic cop 490 queries (402) the master database 493 to direct (403) the user to the correct application version 491. The versioned application 491 queries (404) its corresponding version database 494 to access the data required to fulfill the request (405) back to the user. Once a user has been directed to the appropriate application version, all subsequent requests (406) for that user for that session will go directly to the application version. The different application versions could either be running in different directories on the same application server, different virtual servers on the same application server, or on different application servers altogether. Either way, the master database defines where each application version resides. In one embodiment, different virtual servers on the same application server are used. By always pointing to the traffic cop for the initial request, flexibility is maintained to migrate "something" from one version to another without changing the way the outside world points to the application. For that reason, external pointers to the application are directed to the traffic cop. Exactly what the "something" is and how the traffic cop works are described in greater detail below with the description of the global hierarchy and version subscription.

Figure 5:
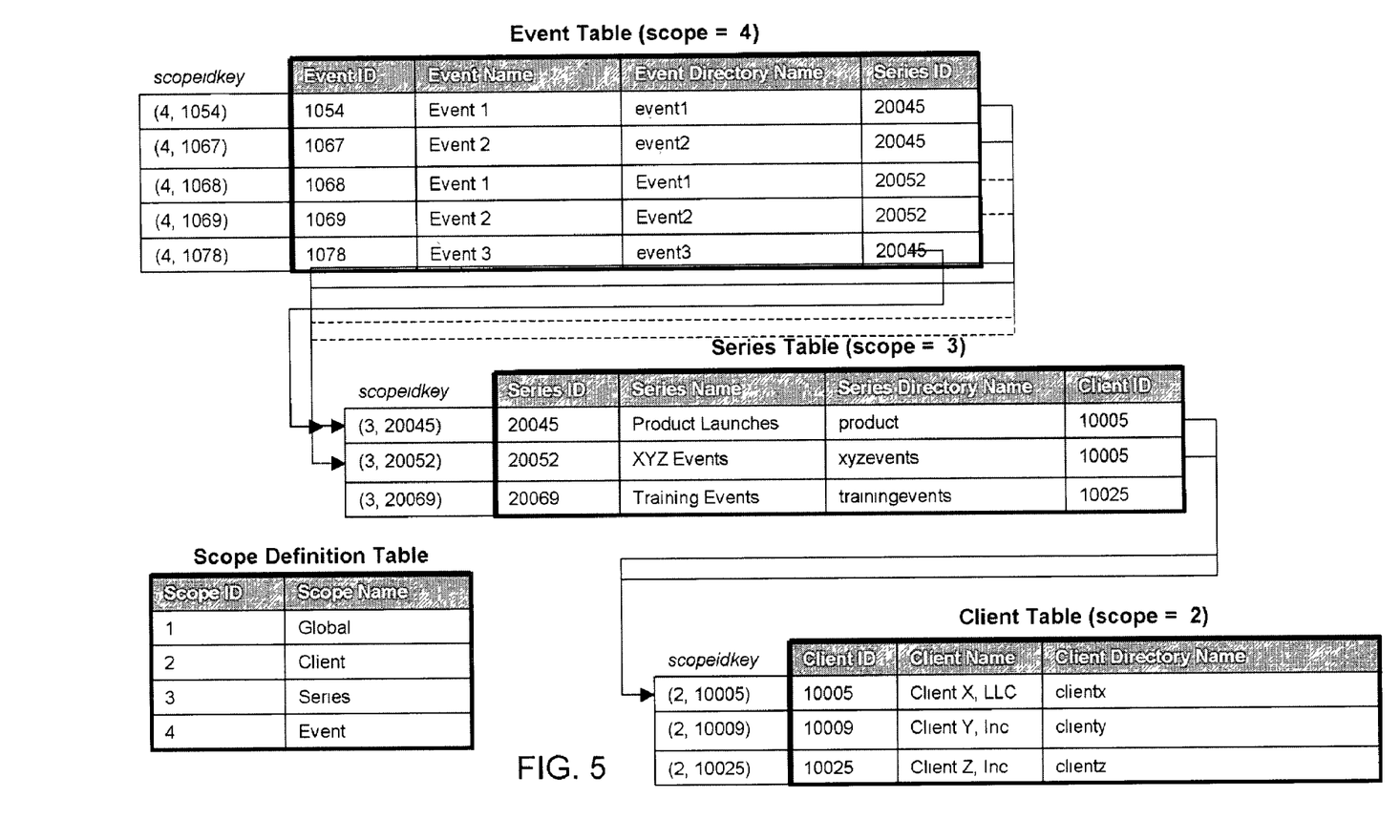
FIG. 5 illustrates tables used in the global hierarchy.

To illustrate this concept, consider the example of providing services for online events. An example of an event could be a one-hour press announcement aired live. In another example, it could be a 15-minute product-training video for a company that is posted for on-demand viewing. Either way, we call one of these an event. Events represent a unique piece of content within the system. Events can be organized into the tree-based hierarchy with global, client, series, and event as the levels in that hierarchy. As shown in FIG. 5, an event, 1054, belongs to a series, 20045, of events (along with zero or more other events, 1067 and 1078). Each series, 20045, belongs to a client, 10005, (along with zero or more other series, 20052). In one implementation, a client signifies a customer. All the clients belong to a single root node called global. The word scope is used to refer to the various levels in the hierarchy and each level is assigned a number, scopeid. Global has a scopeid of 1. Client has a scopeid of 2. Series has a scopeid of 3. Event has a scopeid of 4. Together, this is all referred to as the global hierarchy.

The master database has a separate table for each of the non-global scopes. FIG. 5 shows that client, series, and event each have their own table. At a minimum, each table has a column to store the id, display name, and directory name. Event and series also have a column defining the respective series and client parent objects. With each of these tables defining an id field, we can use a composite key, scopeidkey, made up of scopeid and scopekey that can point to any object in the hierarchy. Scopekey maps to the id field within the respective client, series, or event table depending on the scope. Since the global scope does not have a table defining a set of scopekey, we arbitrarily use −1 as the scopekey for the global object for a scopeidkey of (1,−1). For example, a scopeidkey of (2,432) meaning a scopeid of 2 sending you to the client table to use the scopekey of 432 to look up the object in that table with that number as an id. Scopeidkey is simply an address, a two-field composite key, to point to an object in the global hierarchy. Since three tables, instead of one, are used to define objects in the global hierarchy, the extra piece of information, scopeid, tells us which table to look in. By allowing for one table for each scope, the associated table can have additional fields beyond the required id, name, directory name, and parent if appropriate.

As would be appreciated, the concepts outlined here are not limited to hierarchies with four scopes. Assuming a global root node with a list of leaf objects, similar to our events, the hierarchy could have as few as two scopes or as many as needed to model the business application. The global hierarchy provides a few main benefits. First, it defines a hierarchical navigation structure within the entire application. Second, it provides a foundation for the concept of version subscription, which is described below. Finally, it provides the framework for efficient customization.

Now that it is understood that the "something" maps to an object in the global hierarchy, let's return to the traffic cop. A method is still needed to tell the traffic cop where to direct the requests to the application. This is where version subscriptions come in. Version subscription performs two main tasks. First, it defines the selected application version for objects in the global hierarchy. Second, version subscription provides a foundation to customize how each scopeidkey behaves.

To empower the traffic cop to direct requests to versions properly, you have to decide which scope subscription it will be tied to. All objects defined at a scope with a lower number than the subscription scope will be permitted to span multiple versions. All objects defined at a scope with a higher number will be forced to live in the scope of its parent object. Consider the following example.

We can choose to implement using a series subscription, scope 3. In other words every series is subscribed to one and only one application version. For example, series 20045 is subscribed to version 1.001 and series 20052 is subscribed to version 1.003. The object with a higher numbered scope in our implementation would be a client. Since clients can have one or more series, they can end up having content in multiple versions at the same time. But if the events numbered 1054, 1067, and 1078 all have the parent series 20045, they will all be in version 1.001. A subscription table in the master database maps the series to a version.

With the subscription scope defined, we know the minimum requirements to send a valid request to the traffic cop. A request to the traffic cop must include an object id at the subscription scope level or an object with a higher scope number. To use the example above, a request can either send a series, such as 20045, for a direct mapping to the subscription or an event, such as 1067, requiring the system to look up the global hierarchy until it gets to the series. In the example, the series is the direct parent. Choosing which scope should be the subscription scope is a function of the number of levels in the hierarchy and the business problem to be described by the global hierarchy.

Since the master database defines the base location of each application version, the traffic cop validates incoming requests, looks up the application version, appends the scopeidkey specified in the request to the base location of the application version, and then forwards the request to the application version.

Before completing the description of version subscription, the concept of modules is presented. Modules are discrete features within the application that can be enabled/disabled and customized between different events. For example, our application can provide viewer registration to collect information, synchronized slides to display PowerPoint slides next to the audio/video, and a question/answer (QA) form to submit questions to the presenter for some of our online events. Registration, slides, and QA are all modules within the system. The list of modules would roughly map to the high-level bullet points when describing the business application. In our case, the features of an online streaming media services application.

Each module may have the flexibility to morph itself based on the unique needs of a client. For example, one client may want the registration form to be enabled for all Internet users, while another may want it limited to a known audience through the use of a common password. This introduces the concept of hierarchical module configuration, which allows for different scopeidkeys to customize how particular modules behave. The master database maintains a list of each distinct module. It also stores which module has been implemented in each application version. It is assumed that the implementation of a module could change from one application version to the next.

Determining which module is enabled for a particular scopeidkey is the second main function of version subscription. In addition to picking which application version, version subscription selects which modules are enabled for a given scopeidkey. In our implementation, which uses series subscription, the scopeidkey must have 3 (or series level) as the scopeid. This means that scopeidkeys that are children of the subscribed scopeidkey (in our example events 1054, 1067, and 1078 in a series 20045) will all be subscribed to by the same modules. If a new event needs to utilize a module not already subscribed in an existing series, a new series would be created.

One final function performed by version subscription is determining the scope to subscribe each module to a given series. By specifying the scope for each module when setting the version subscription, we're enabled to do two things. First, it tells us how to store the data for that module and scopeidkey. We'll return to this concept later. Second it tells us which scope to look for the hierarchical module configuration As noted, each module has different features that can be customized from one scopeidkey to the next. The master database stores a list of the different configuration items. Furthermore, we store a list of which items can be configured for each module for each application version. For example, in version 1.001, the registration module only had one configuration item, "common password: yes or no." So after, a scopeidkey was subscribed to version 1.001, there was only one decision to make for the registration module. But version 1.002 added a new configuration item, "individual password: yes or no." In this case, once you subscribe this module to version 1.002, there were two decisions to make. In other words, picking the main features is done by subscribing to modules. Specifying how features within that module should behave is done by setting the hierarchical module configuration after the version has been selected and you know which configuration items are relevant and the scope they need to be set at.

All the system definition and configuration information discussed up to this point is stored in the master database. It may be queried by versioned applications through stored procedures in the versioned databases, but it's centrally stored to provide a consistent framework for all versioned applications to be built on. Furthermore, it provides an easy way to view all objects (clients, series of events, events) and the high-level information describing which system features relate to which scopeidkeys.

The implementation of the modules and their respective configuration items are all done in the versioned applications. All related data is stored in its corresponding versioned database. This leaves the master database and traffic cop application free of data and code, respectively that is specific to the business problem being solved. How we store the data for a given scopeidkey and module brings us back to the scope it was configured at. Storage of data in this context refers to both data pre-loaded into the database prior to the event, such as the list of PowerPoint slide images, as well as data collected from users of the system during the event, such as responses to questions on the registration form. Assuming the example where a client had an event with a registration form as the entry point, if the registration form only related to that single event, the scope that the registration module would be subscribed at would be 4 (or event level). On the other hand, if that same registration (and its corresponding registrant data) is to be used for access to every event in the series, the scope that the registration module would be subscribed at would be 3 (or series level). In other words, if the module is subscribed at the series scope, the data is shared by all events in the series. If it's subscribed at the event scope, the data relates to that event only. This enables pre-population and/or collection from users, of no more and no less data than is needed.

Moving from efficient use of data to efficient use of code, every module has a configuration item called code location. Remember, as illustrated in FIG. 5, that the client, series, and event tables each have a field storing the directory name for that scopeidkey. Each application version specifies a single global directory and the client/series/event directory hierarchy lives below that. When a request comes in for a particular module, it will process its standard code and then forward the request to the code in the code location. This code could be located in the global, client, series, or event directory.

Our implementation using Enterprise Java as specified by the J2EE specification, but any language with the capability to forward requests will suffice.

When code is developed, we start with code for each module in the global directory. If no customers ask for special functionality, it ends there. They often do, however. So if client X asks for special functionality in the registration module that they expect to use for every event in every series, we would copy our global code into their client directory, make the appropriate changes and set the code location on all registration configuration to point to their client directory. It works the same way for series and event level code. This provides the appropriate balance between code reuse and flexibility in code-level customization.

The final concept is hierarchical data. This is the same concept as code location, but with miscellaneous data. Each application version has a module parameters table that stores data by scopeidkey, module, and parameter name. The same goal is in place as the code location. For a given parameter name and module, we would like to store only one record of data under the global scope id (1,−1). But different clients want different sizes, names, color, etc. for the various features of our application. Furthermore, the client may have a default they desire to use, but for one event here and there, they want a different value for some feature. For example, a web page may need to be opened in a window 750 pixels wide. The global value for the "pagewidth" parameter for the "custom player" module would be set to 750. If some customer, with client id of 10005, asked us to develop a bigger page for all their events, we would add one record to the table setting the value to 775 for the scopeidkey (2,10005) for "pagewidth". If they wanted event 1324 to be just a little bigger, we could add a record setting scopeidkey (4,1324) to a value of 780. This would allow the code that pops up this web page in a perfectly-sized window to simply ask for the "pagewidth" hierarchical data. In this case, the request starts at the highest scope and continues to lower scopes until it finds the value set. At a minimum, we always set a value at the global level for every variable used in our code. This technique allows a high degree of customization with the storage of a minimal amount of data. Furthermore, the flexibility of the module parameters table, allow us to add new types of data for a module by creating new parameter names, alleviating the need to change the database schema.

The combination of all these concepts provide a system architecture to combat the challenges of a fast moving industry requiring continual improvements in technology implementation, flexibility from one client opportunity to the next, and a mechanism to seamlessly upgrade clients to new functionality, all with a minimal reuse of both code and data.

While the invention has been described in detail and with reference to specific embodiments thereof, it will be apparent to one skilled in the art that various changes and modifications can be made therein without departing from the spirit and scope thereof. Thus, it is intended that the present invention covers the modifications and variations of this invention provided they come within the scope of the appended claims and their equivalents.

What is claimed is:

1. A computer program product comprising a computer readable medium having computer-readable program codes stored therein, the computer-readable program codes comprising:
   computer-readable program code for causing a computer to monitor a stream to determine a time position of said stream;
   computer-readable program code for causing a computer to determine whether said monitored time position matches a time code in an event list;
   computer-readable program code for causing the computer to display the event list simultaneously with displaying a window providing the stream and a preview window providing content items for inclusion in the stream at a time position of a corresponding time code in the event list, wherein the time code in the event list is determinable by a viewer simultaneously with the stream before or during a playing of the stream; and
   computer-readable program code for causing a computer to execute an action associated with said time code if said monitored time position matches said time code.

2. The computer program product of claim 1, wherein said action is a display of a caption.

3. The computer program product of claim 1, wherein said action is a display of a slide.

4. The computer program product of claim 1, wherein said action is a display of a poll.

5. The computer program product of claim 1, wherein said action is a display of a pop-up window.

6. The computer program product of claim 1, wherein an entry in said event list includes a time code, an identification of a resource, and an instruction for how to handle the event.

7. The computer program product of claim 6, wherein said identification includes a file name and a uniform resource locator.

* * * * *

UNITED STATES PATENT AND TRADEMARK OFFICE
CERTIFICATE OF CORRECTION

PATENT NO. : 7,617,272 B2  Page 1 of 1
APPLICATION NO. : 10/252400
DATED : November 10, 2009
INVENTOR(S) : Bulson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1491 days.

Signed and Sealed this

Nineteenth Day of October, 2010

David J. Kappos
*Director of the United States Patent and Trademark Office*